US009094116B1

(12) United States Patent
Narasimhan et al.

(10) Patent No.: US 9,094,116 B1
(45) Date of Patent: *Jul. 28, 2015

(54) MIMO-OFDM RECEIVER PROCESSING (71) Applicant: Marvell International Ltd., Hamilton (BM)

(72) Inventors: Ravi Narasimhan, Los Altos, CA (US); Hemanth Sampath, Sunnyvale, CA (US); Hsiao-Cheng Tang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,665

(22) Filed: Jan. 2, 2014

Related U.S. Application Data (63) Continuation of application No. 13/669,167, filed on Nov. 5, 2012, now Pat. No. 8,634,451, which is a continuation of application No. 12/876,034, filed on Sep. 3, 2010, now Pat. No. 8,306,094, which is a continuation of application No. 12/179,830, filed on Jul. 25, 2008, now Pat. No. 7,796,681, which is a continuation of application No. 10/912,829, filed on Aug. 5, 2004, now Pat. No. 7,408,976.

(60) Provisional application No. 60/572,934, filed on May 19, 2004.

(51) Int. Cl.
H04B 3/46 (2006.01)
H04B 17/00 (2015.01)
H04L 1/00 (2006.01)
H04L 27/26 (2006.01)

(52) U.S. Cl.
CPC .......... *H04B 17/0062* (2013.01); *H04L 1/0054* (2013.01); *H04L 27/266* (2013.01); *H04L 27/2663* (2013.01)

(58) Field of Classification Search
CPC .......................... H04L 1/205; G01R 31/31709
USPC ................. 375/226, 130, 148, 229, 347–349; 455/100, 132
See application file for complete search history.

(56) References Cited

U.S. PATENT DOCUMENTS 7,269,430 B2 9/2007 Moorti et al.
7,463,577 B2 12/2008 Sudo et al.
(Continued)

OTHER PUBLICATIONS

IEEE Computer Society, "*Information Technology—Telecommunications and Information Exchange Between Systems—Local and Metropolitan Area Networks—Specific Requirements—Part 11: Wireless LAN Medium Access Control (MAC) and Physical Layer (PHY) Specifications*", IEEE Std 802.11—First Edition, 1999.
(Continued)

Primary Examiner — Khai Tran (57) ABSTRACT

A device includes circuitry configured to receive orthogonal frequency-division multiplexing (OFDM) symbols of a training sequence via two or more receive antennas, and circuitry configured to correlate training samples of the OFDM symbols received via the two or more receive antennas to generate a correlation result, estimate a frequency offset using an angle of the correlation result, and correct samples of training symbols in at least one multiple-in-multiple-out (MIMO)-OFDM frame using the frequency offset.

21 Claims, 8 Drawing Sheets

(56) References Cited

U.S. PATENT DOCUMENTS

| | | | |
|---|---|---|---|
| 8,098,713 B2 * | 1/2012 | Baxley et al. | 375/145 |
| 8,306,094 B1 * | 11/2012 | Narasimhan et al. | 375/148 |
| 2004/0114675 A1 | 6/2004 | Crawford | |
| 2004/0136313 A1 | 7/2004 | Goldstein et al. | |
| 2005/0180312 A1 | 8/2005 | Walton et al. | |
| 2005/0195733 A1 | 9/2005 | Walton et al. | |
| 2006/0014494 A1 | 1/2006 | Vanderperren et al. | |
| 2006/0252386 A1 | 11/2006 | Boer et al. | |

OTHER PUBLICATIONS

IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-speed Physical Layer in the 5 GHZ Band*", IEEE Std 802.11a-1999 (Supplement to IEEE Std 802.11-1999).

IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 GHZ Band*", IEEE Std 802.11b-1999 (Supplement to IEEE Std 802.11-1999).

IEEE Computer Society, "*IEEE Standard for Information Technology—Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band*", IEEE P802.11g/D8.2, Apr. 2003.

IEEE Std 802.11a-1999(R2003), Part 11: Wireless LAN Medium Access Control (MAC) and Physical Layer (PHY) specifications, High-speed Physical Layer in the 5 GHZ Band, Jun. 12, 2003, pp. 7-8.

van Nee, Richard, A new OFDM standard for high rate wireless LAN in the 5 GHz band; Vehicular Technology Conference, 1999. VTC 1999-Fall. IEEE VTS $50^{th}$ vol. 1, Sep. 19-22, 1999 pp. 258-262 discloses a system with relevance to claims 1-60.

* cited by examiner

FIG. 7 receive section of an IEEE 802.11a receiver, but with some modifications to account for the multiple receive antennas.

Figure 1:
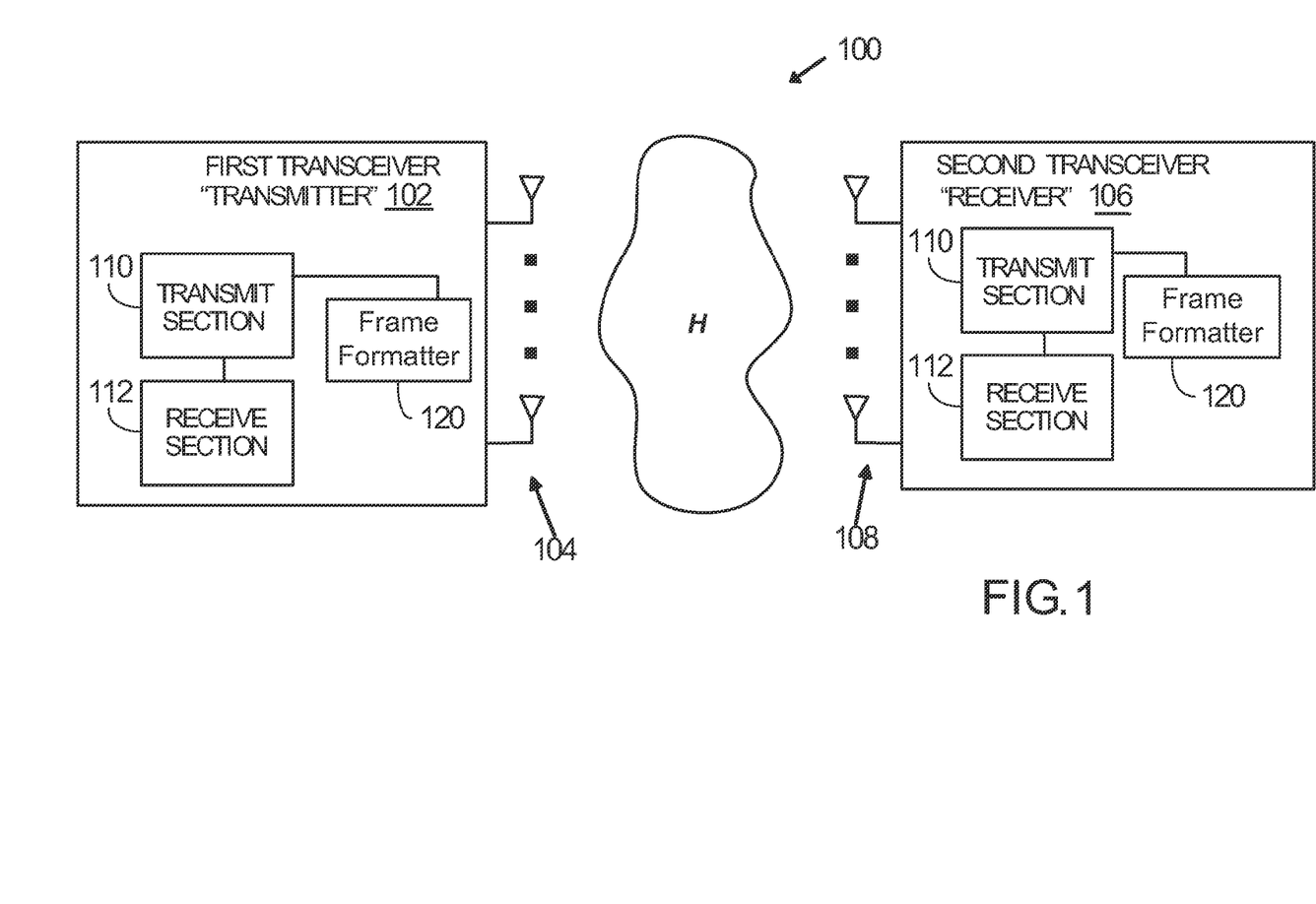
Figure 2:
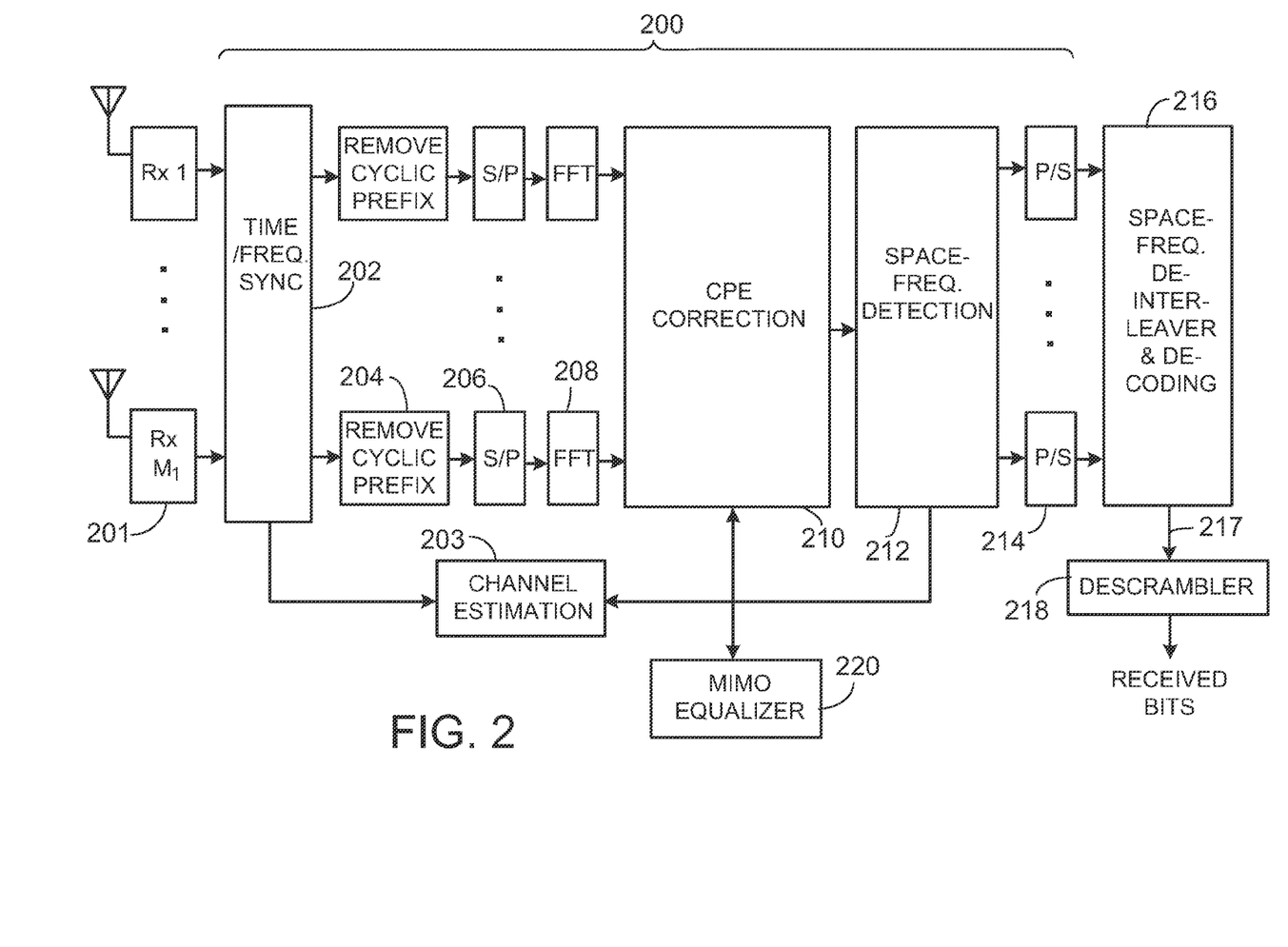

Signals received on the multiple receive antennas are input to corresponding processing chains 200. Each processing chain includes a radio-frequency (RF) module 201 for RF-to-baseband and analog-to-digital (A/D) conversion. The receiver may have a common automatic gain control (AGC) for all antennas to provide minimal gain across all the receive antennas. A time/frequency synchronization module 202 performs synchronization operations and extracts information from the multiple substreams (for $r_s$>1) for channel estimation 203. Each processing chain 200 includes a cyclic prefix removal module 204, serial-to-parallel (S/P) converter 206, fast Fourier transform (FFT) module 208, a common phase error (CPE) correction module 210, a space-frequency detection module 212, and a parallel-to-serial (P/S) converter 214. The multiple substreams are input to a space-frequency deinterleaver and decoding module 216 which de-interleaves the substreams into a single data stream 217 and performs soft Viterbi decoding. The single stream is then input to a descrambler 218.

Figure 3:
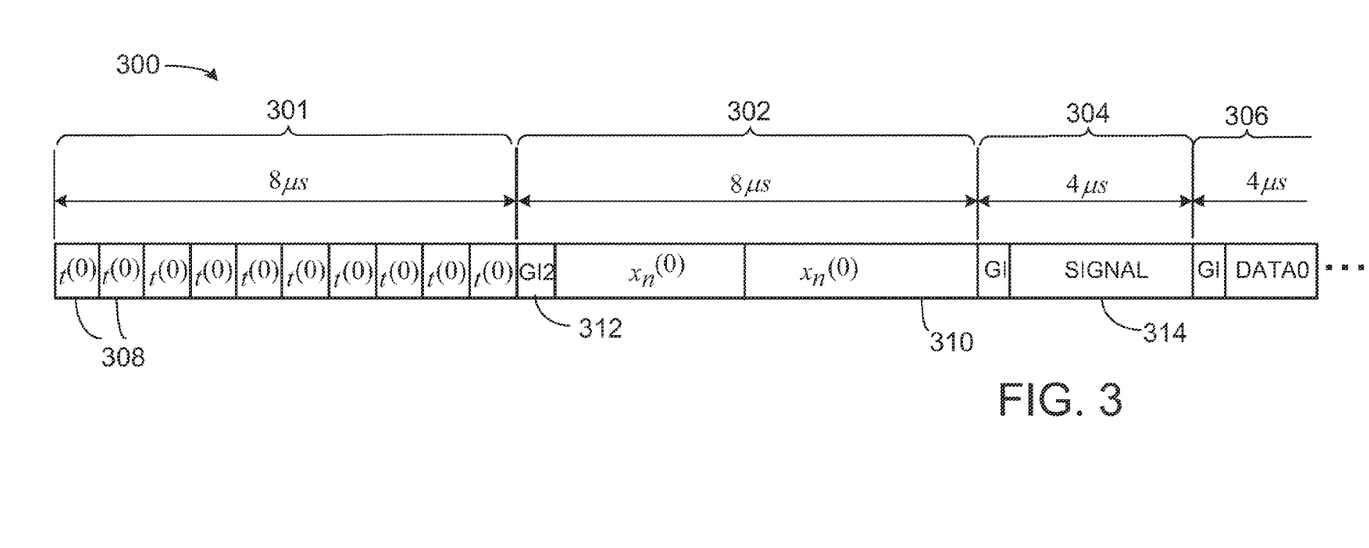

The MIMO-OFDM system may be compatible with IEEE 802.11a systems, and consequently may have many similarities to an IEEE 802.11a system. For example, like IEEE 802.11a systems, the MIMO-OFDM system may use 52 tones (48 data tones and 4 pilot tones), 312.5 kHz subcarrier spacing, an FFT/inverse FFT (IFFT) period of 3.2 μs, a cyclic prefix with a duration of 0.8 μs, and an OFDM symbol duration of 4.0 μs. The MIMO-OFDM system may also use a frame format 300 similar to that specified by IEEE 802.11a, which is shown in FIG. 3. In addition, variations of the MIMO-OFDM systems are also possible, including using different numbers of tones, different guard intervals, different forward error correction codes, and different constellations.

An IEEE 802.11a frame 300 includes a short preamble 301, a long preamble 302, a header 304, and a DATA field 306. The short preamble 301 includes a short training symbol 308 with a duration of 0.8 μs repeated ten times. The short preamble may be used for signal detection, AGC, coarse frequency offset estimation, and symbol timing estimation.

The long preamble 302 includes two long training symbols 310, each of duration 3.2 μs, which are separated from the short training symbols 308 by a long guard interval (1.6 μs) 312. The long preamble is used for fine frequency offset estimation and channel estimation.

The header 304 includes a SIGNAL symbol 314, which is encoded at 6 Mbps. The SIGNAL symbol 314 is 12 bits in length and includes 4 bits for the data rate, 1 reserved bit, 1 parity bit, and 6 tail bits (set to "0" to return the convolutional decoder to State 0).

The DATA field 306 includes OFDM symbols including the data bits to be transmitted. The data bits are prepended by a 16-bit SERVICE field and are appended by 6 tail bits. The resulting bits are appended by a number of pad bits needed to yield an integer number of OFDM symbols.

Figure 4:
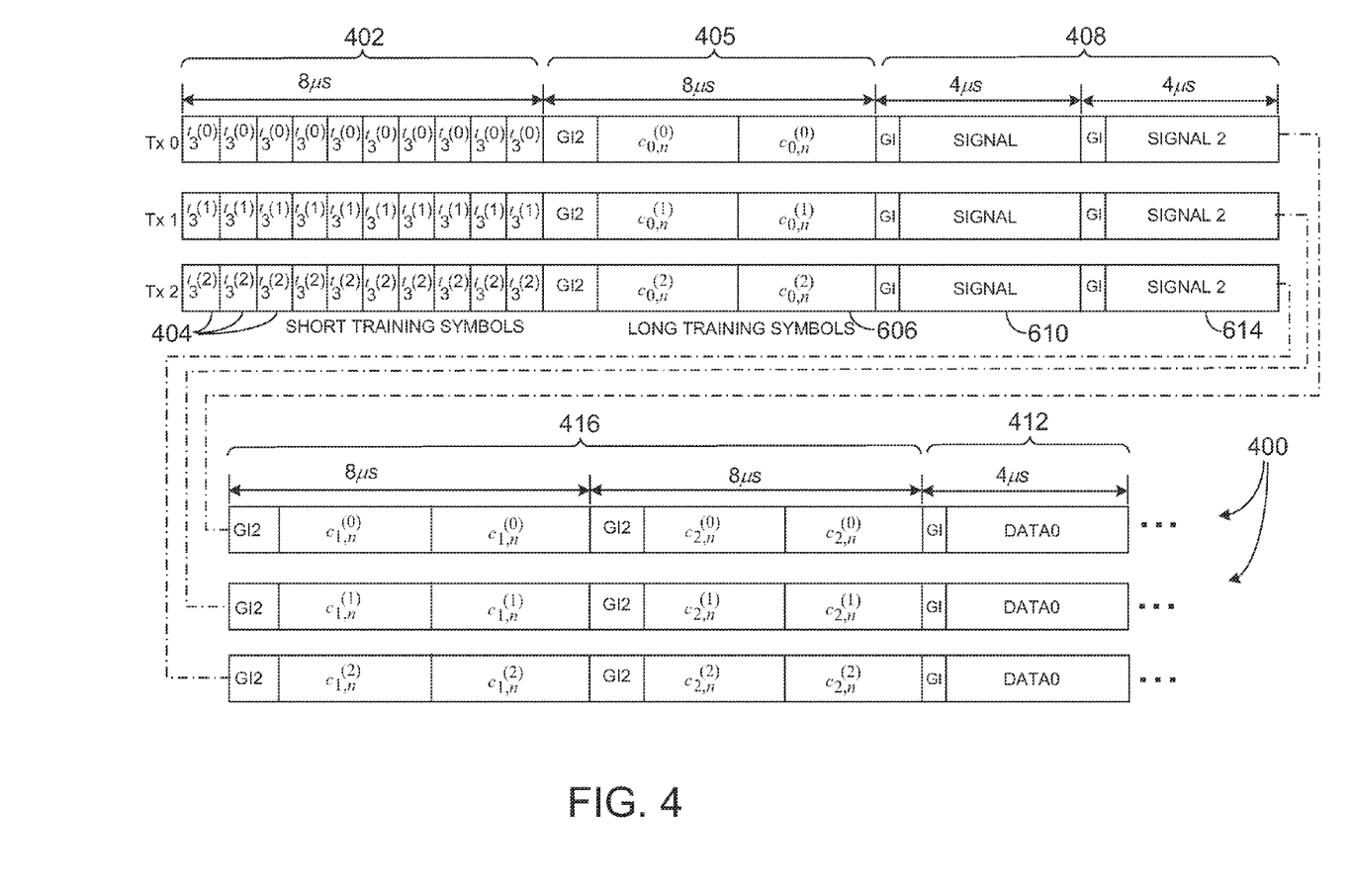

The MIMO-OFDM system 100 may use a similar frame format 400, as shown in FIG. 4. The illustrated frame format 400 is for systems with three transmit antennas (MT=3), but can be modified for other MT. Each transmit antenna transmits a different MIMO-OFDM frame 400. Like the IEEE 802.11a frame 300, the MIMO-OFDM frames 400 include a short preamble 402 with a series of short training symbols 404, a long preamble 405 with a set of two long training symbols 606, a header 408 including a SIGNAL symbol 610, and a data field 412. In addition, the header 408 may include a second SIGNAL symbol (SIGNAL2) 614, which may be used to transmit MIMO-OFDM-specific information, such as the number of transmit antennas and the spatial multiplexing rate. The frame may also include a supplemental long preamble 416 including MT−1 additional long training symbols to train the other antennas.

As in IEEE 802.11a, a short OFDM training symbol consists of 12 tones, which are modulated by the elements of the following frequency-domain sequence:

$$S_{-26,26} = \sqrt{\frac{13}{6}} \times \{0, 0, 1+j, 0, 0, 0, -1-j, 0, 0, 0, 1+j, 0, 0, 0, -1-j, 0, 0,$$
$$0, -1-j, 0, 0, 0, 1+j, 0, 0, 0, 0, 0, 0, 0, -1-j, 0, 0, 0, -1-j,$$
$$0, 0, 0, 1+j, 0, 0, 0, 1+j, 0, 0, 0, 1+j, 0, 0, 0, 1+j, 0, 0\}$$

The multiplication by $\sqrt{13/6}$ is in order to normalize the average power of the resulting OFDM symbol. The short training symbol has a duration of 0.8 μs and is repeated 10 times.

As in IEEE 802.11a, a long training OFDM symbol includes 52 tones, which are modulated by the following frequency-domain BPSK training sequence:

$$L_{-26,26} = \{1,1,-1,-1,1,1,-1,1,-1,1,1,1,1,1,1,-1,-1,1,1,-$$
$$1,1,-1,1,1,1,1,0,1,-1,-1,1,1,-1,1,-1,1,-1,1,-$$
$$1,-1,-1,1,1,-1,-1,1,1,-1,1,-1,1,1,1,1,1\}$$

The number of sets of long training symbols (or "long preambles") may be $M_T$ for all spatial multiplexing rates. The additional long training symbols may be used to estimate the full $M_R \times M_T$ channel matrix. This estimation may be used for link adaptation, in which modulation, coding rate, and/or other signal transmission parameters may be dynamically adapted to the changing channel conditions.

Figure 5A:
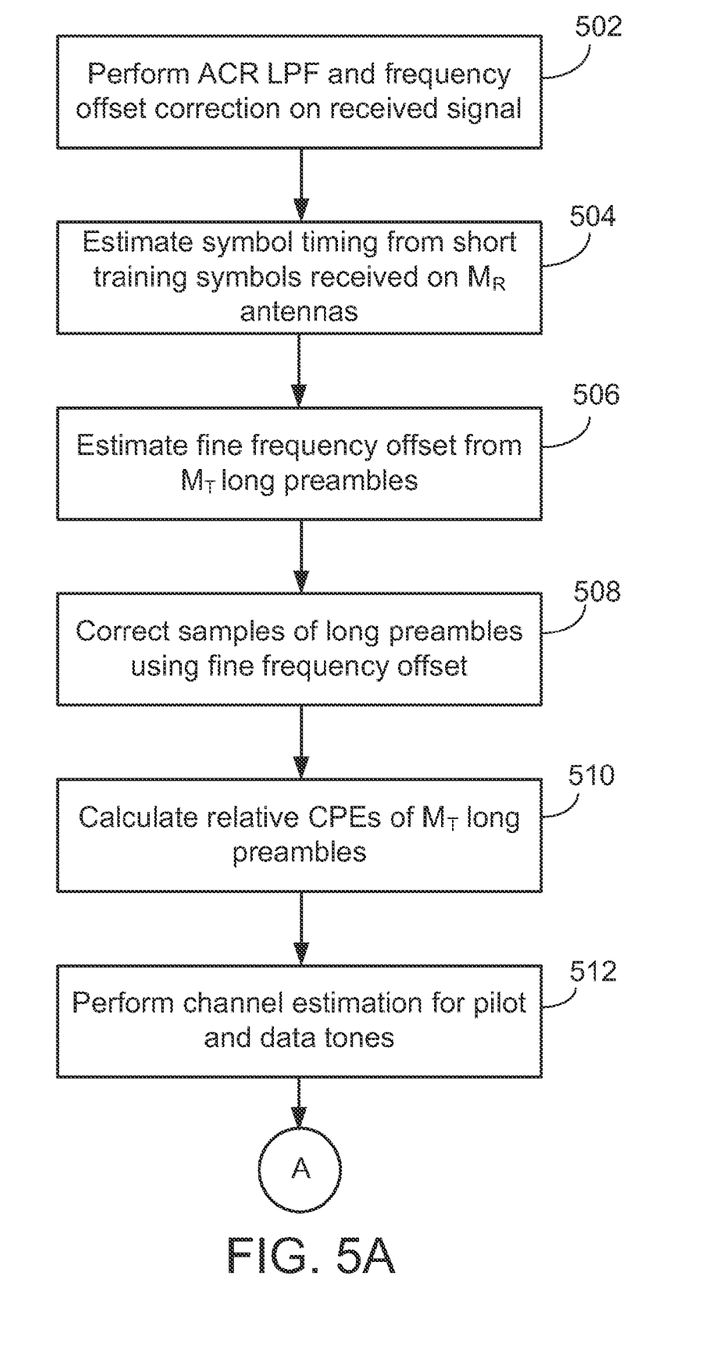
Figure 5B:
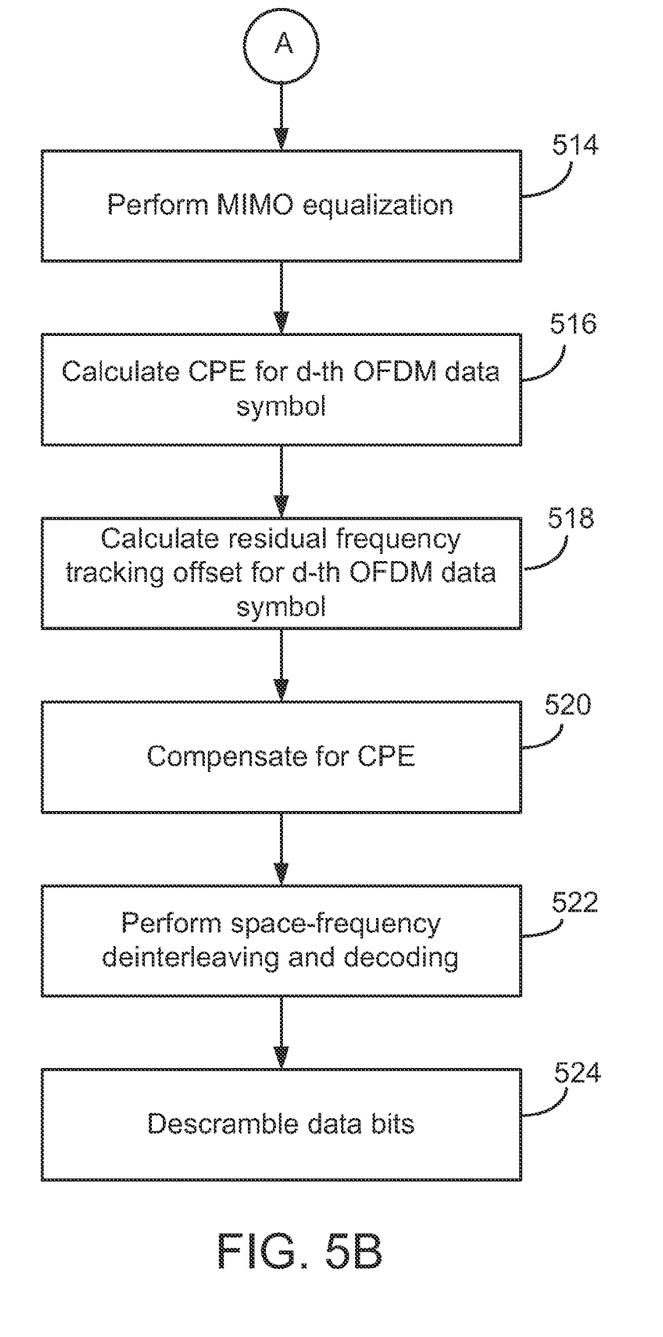
Figure 6:
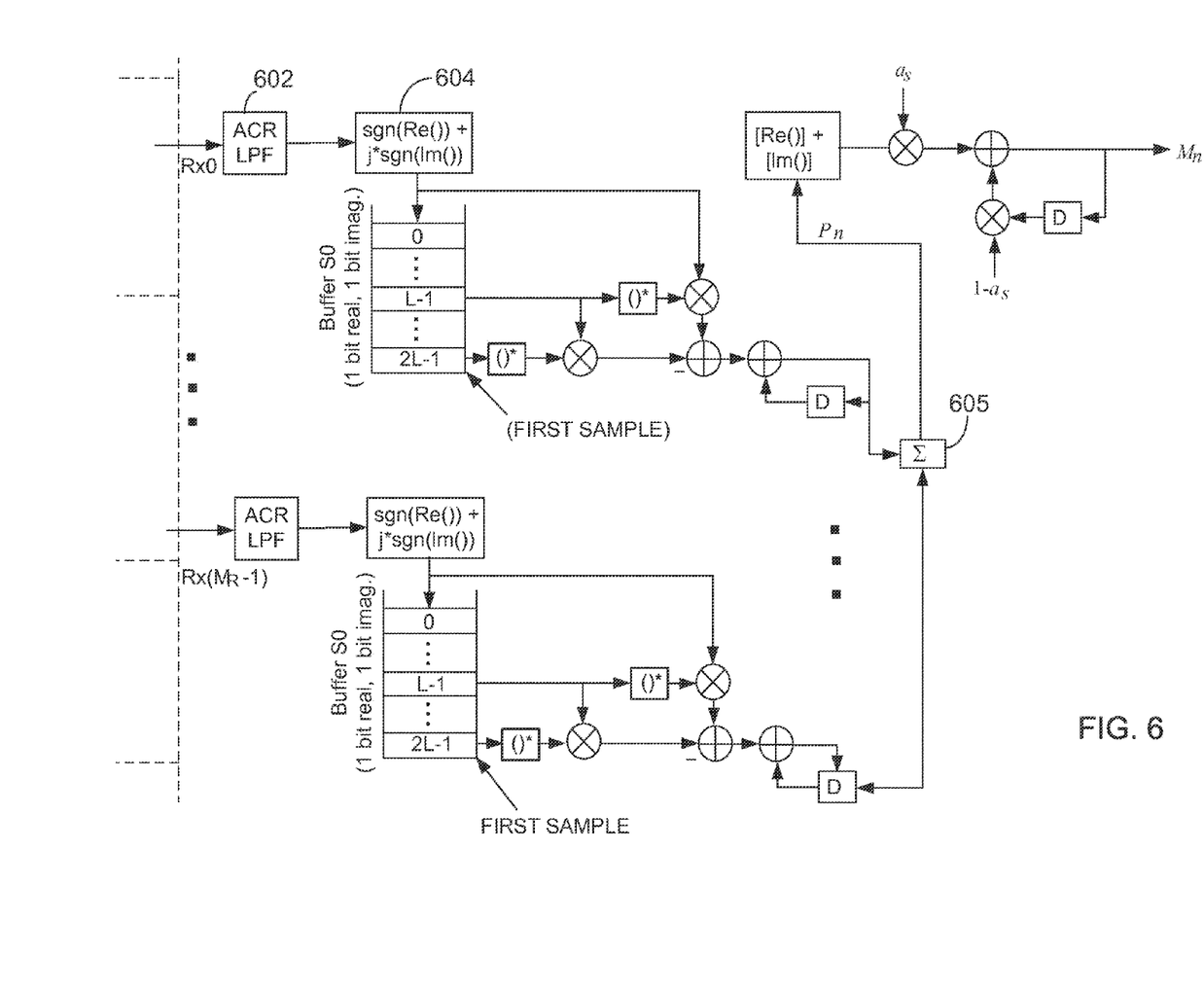

FIGS. 5A-5B show a flowchart describing a MIMO-OFDM signal processing operation 500 performed by the receiver 106. FIG. 6 shows a portion of the time/frequency synchronization module 202. The module 202 may perform adjacent channel rejection (ACR) and low pass filtering (LPF) operations (using ACR LPF module 602) and frequency offset correction on the received signals (block 502).

The time/frequency synchronization module 202 may use the short training symbols to estimate symbol timing (block 504). The received signal for the i-th receive antenna and n-th sample ($r_{i,n}$) may be used by a computation module 604 to generate a quantity $q_{i,n}$ using the following equation:

$$q_{i,n} = \text{sgn}[Re(r_{i,n})] + j\, \text{sgn}[Im(r_{i,n})].$$

The quantity $q_{i,n}$ calculated for each of the MR antennas may be used by a summing module 605 to generate a metric $P_n$ for the n-th sample using the following equation:

$$P_n = \sum_{i=0}^{M_R-1} \sum_{m=1}^{L} q^*_{i,n+m-2L} q_{i,n+m-L},$$

where L denotes the number of samples in one short training symbol. A value $M_n$ for the n-th sample may then be computed using the following equation:

$$M_n = (1-\alpha_S)M_{n-1} + \alpha_S(|Re(P_n)| + |Im(P_n)|),$$

where the parameter $\alpha_S$ may have a value in the range of (0, . . . , 31/64), e.g., 3/32 for a 40 MHz analog-to-digital (A/D) conversion rate.

Figure 7:
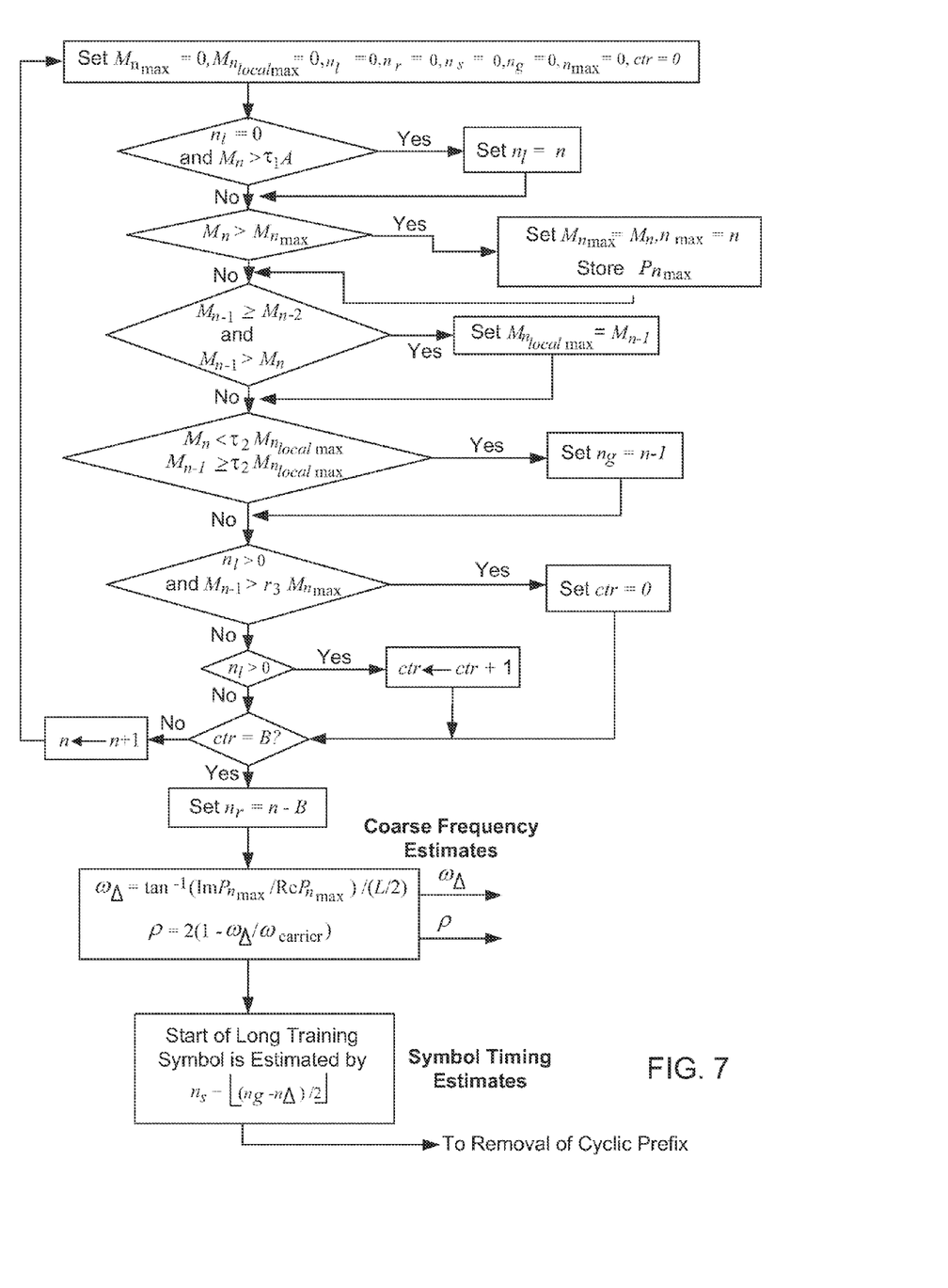

The value $M_n$ may be used to estimate the symbol timing as in IEEE 802.11a, with the exception of using a more flexible threshold $\tau_3$ to check for $n_r$ (right endpoint of the plateau), as shown in FIG. 7. Typical parameter values for a 40 MHz analog-to-digital (A/D) conversion rate are given in Table 1.

TABLE 1

| Parameter | Exemplary value | Range |
|---|---|---|
| L | 32 | |
| $\tau_1$ | 0.375 | (0, ..., 255/256) |
| A | 64 * $M_R$ | |
| $\tau_2$ | 0.890625 | (0, ..., 255/256) |
| $\tau_3$ | 0.5 | (0, ..., 255/256) |
| B | 15 | (0, ..., 63) |
| $n_D$ | 25 | (0, ..., 63) |

The time/frequency synchronization module 202 may estimate the fine frequency offset (block 506) by correlating the received $M_R \times 1$ vectors from the two long training symbols in a long preamble using the following equation:

$$C = \sum_{i=0}^{M_R-1} \sum_{n=0}^{N-1} r_{i,n}^* r_{i,n+N},$$

where N is the FFT size. The angle of the correlation result ($\Delta \hat{f}$) may be used to estimate the fine frequency offset using the following equation:

$$\Delta \hat{f} = \frac{\arg(C)}{2\pi N T_S},$$

where $T_S$ is the sampling period at the FFT 208 output. The time/frequency synchronization module 202 may correct samples of long training symbols using the estimated fine frequency offset (block 508).

The channel estimation module 203 may perform channel estimation by averaging the corrected samples corresponding to the two long training symbols in a long preamble for all receive antennas 108. The channel estimation module 203 may compute the relative CPEs of the $M_T$ long preambles (block 510) using the following equation:

$$CPE_p = \frac{\sum_{k \in K_{pilots}} \sum_{i=0}^{M_R-1} R_{i,k}^{(0)*} R_{i,k}^{(p)}}{\sum_{k \in K_{pilots}} \sum_{i=0}^{M_R-1} |R_{i,k}^{(0)}|^2}, \quad p = 1, \ldots, M_T - 1,$$

where $CPE_0 = 1$, $R_{i,k}^{(p)}$ is the k-th FFT output for the i-th receive antenna and p-th preamble, and $K_{pilots}$ are the indices of the pilot tones. As in IEEE 802.11a, tones k=−21, −7, 7, and 21 are used for pilot tones in each data MIMO-OFDM symbol.

The channel estimation module 203 may generate channel estimates for the pilot tones and data tones using the frequency domain BPSK (Biphase Shifting Key) long training symbols ($L_k$) (block 512). For the data tones, the subcarrier channel estimates may be calculated using the following equation:

$$\hat{h}_{i,k}^{(p)} = R_{i,k}^{(p)} / (L_k CPE_p \sqrt{\hat{r}_s}),$$

where $\hat{h}_{i,k}^{(p)}$ is the channel estimate for the k-th tone, i-th receive antenna, and p-th preamble. For the pilot tones, which are always sent on the same tone, the subcarrier channel estimates may be calculated using the following equation:

$$\hat{h}_{i,k}^{(0)} = R_{i,k}^{(0)} / L_k.$$

An equalizer 220 may perform MIMO equalization (block 514) by forming an $M_R \times r_S$ effective channel matrix for data tone k:

$$\hat{H}_k = \begin{bmatrix} \hat{h}_{0,k}^{(0)} & \cdots & \hat{h}_{0,k}^{(r_s-1)} \\ \vdots & \ddots & \vdots \\ \hat{h}_{M_R-1,k}^{(0)} & \cdots & \hat{h}_{M_R-1,k}^{(r_s-1)} \end{bmatrix}.$$

The equalizer 220 may use a zero forcing equalizer per tone:

$$G_k = (\hat{H}_k^* \hat{H}_k)^{-1} \hat{H}_k^*.$$

The equalizer 220 may then compute a bit-metric weight for the l-th substream, which equals the normalized post-processing signal-to-noise ratio (SNR) of the l-th substream:

$$W_{l,k} = \frac{1}{[(\hat{H}_k^* \hat{H}_k)^{-1}]_{l,l}},$$

where l,l represents the diagonal element.

The CPE correction module 210 may generate a scalar CPE estimate for the d-th data symbol (block 518) using the following equation:

$$CPE^{(d)} = \frac{\sum_{k \in K_{pilots}} \sum_{i=0}^{M_R-1} P_k \hat{h}_{i,k}^{(0)*} Y_{i,k}^{(d)}}{\sum_{k \in K_{pilots}} \sum_{i=0}^{M_R-1} |\hat{h}_{i,k}^{(0)}|^2},$$

where $Y_{i,k}^{(d)}$ is the k-th output for the i-th receive antenna and d-th data symbol, and $P_k \in \{1,-1\}$ is the BPSK pilot symbol for tone k.

Using this CPE value, the CPE correction module 210 can determine the residual frequency offset tracking for the d-th OFDM data symbol ($\Delta \hat{f}^{(d)}$) (block 518) using the following equation:

$$\Delta \hat{f}^{(d)} = \Delta \hat{f}^{(d-1)} + \beta Im[CPE^{(d)}].$$

The space-frequency detection module 212 may generate the k-th output for the d-th data symbol by concatenating the corresponding outputs of the $M_R$ receive antennas:

$$Y_k^{(d)} = [Y_{0,k}^{(d)} \; Y_{1,k}^{(d)} \ldots Y_{M_R-1,k}^{(d)}]^T.$$

The space-frequency detection module 212 may then form an equalized signal for data tone k using the zero forcing equalizer for the tone ($G_k$):

$$\tilde{X}_k^{(d)} = G_k Y_k^{(d)}.$$

The space-frequency detection module 212 may then compensate for CPE (block 520) using the following equations:

$$\hat{X}_k^{(d)} = \tilde{X}_k^{(d)} / CPE^{(d)};$$

$$\hat{W}_{l,k} = |CPE^{(d)}|^2 W_{l,k}.$$

The CPE compensated weight value for the l-th substream ($\hat{W}_{l,k}$) may be used to obtain log-likelihood ratios (LLRs) for soft Viterbi decoding. As in IEEE 802.11a, the space-frequency deinterleaving and decoding module 216 may concatenate LLRs for each substream into a single sequence, deinterleave the LLR sequence, and decode data bits using soft Viterbi decoding (block 522). The descrambler may then descramble data bits using scrambler state estimation obtained from the SERVICE field (block 524).

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A device comprising:
   circuitry configured to receive orthogonal frequency-division multiplexing (OFDM) symbols of a training sequence via two or more receive antennas; and
   circuitry configured to correlate training samples of the OFDM symbols received via the two or more receive antennas to generate a correlation result, estimate a frequency offset using an angle of the correlation result, and correct samples of training symbols in at least one multiple-in-multiple-out (MIMO)-OFDM frame using the frequency offset.

2. The device of claim 1, comprising a receiver including the circuitry configured to receive and the circuitry configured to correlate, estimate, and correct;
   wherein the receiver has a common automatic gain control (AGC) for all of the two or more receive antennas, and the receiver is configured to use a threshold $\tau_3$ to check for a right plateau endpoint.

3. The device of claim 1, comprising:
   circuitry configured to calculate a fast Fourier transform value for each of the two or more receive antennas; and
   circuitry configured to determine relative common phase error values for preambles in the at least one MIMO-OFDM frame using the fast Fourier transform values.

4. The device of claim 3, comprising circuitry configured to generate subcarrier channel estimates using the relative common phase error values.

5. The device of claim 4, comprising circuitry configured to form an effective channel matrix, use zero forcing equalizer per subcarrier, and compute a bit metric weight for a substream.

6. The device of claim 5, comprising circuitry configured to generate a scalar common phase error estimate for each data symbol, and determine residual frequency offset tracking for each data symbol using the corresponding scalar common phase error estimate.

7. The device of claim 6, comprising circuitry configured to form an equalized signal for a data subcarrier using a corresponding zero forcing equalizer, compensate for common phase error in the equalized signal for the data subcarrier, and use the compensated signal to obtain a log-likelihood ratio for a soft Viterbi decoder.

8. A method comprising:
   receiving orthogonal frequency-division multiplexing (OFDM) symbols of a training sequence via two or more receive antennas;
   correlating training samples of the OFDM symbols received via the two or more receive antennas to generate a correlation result;
   estimating a frequency offset using an angle of the correlation result; and
   correcting samples of training symbols in at least one multiple-in-multiple-out (MIMO)-OFDM frame using the frequency offset.

9. The method of claim 8, comprising using a threshold $\tau_3$, in a receiver having a common automatic gain control (AGC) for all of the two or more receive antennas, to check for a right plateau endpoint.

10. The method of claim 8, comprising:
    calculating a fast Fourier transform value for each of the two or more receive antennas; and
    determining relative common phase error values for preambles in the at least one MIMO-OFDM frame using the fast Fourier transform values.

11. The method of claim 10, comprising generating subcarrier channel estimates using the relative common phase error values.

12. The method of claim 11, comprising:
    forming an effective channel matrix;
    using zero forcing equalizer per subcarrier; and
    computing a bit metric weight for a substream.

13. The method of claim 12, comprising:
    generating a scalar common phase error estimate for each data symbol; and
    determining residual frequency offset tracking for each data symbol using the corresponding scalar common phase error estimate.

14. The method of claim 13, comprising:
    forming an equalized signal for a data subcarrier using a corresponding zero forcing equalizer;
    compensating for common phase error in the equalized signal for the data subcarrier; and
    using the compensated signal to obtain a log-likelihood ratio for a soft Viterbi decoder.

15. A non-transitory medium configured to cause a signal processing apparatus to perform operations comprising:
    receiving orthogonal frequency-division multiplexing (OFDM) symbols of a training sequence via two or more receive antennas;
    correlating training samples of the OFDM symbols received via the two or more receive antennas to generate a correlation result;
    estimating a frequency offset using an angle of the correlation result; and
    correcting samples of training symbols in at least one multiple-in-multiple-out (MIMO)-OFDM frame using the frequency offset.

16. The non-transitory medium of claim 15, the operations comprising using a threshold $\tau_3$, in a receiver having a common automatic gain control (AGC) for all of the two or more receive antennas, to check for a right plateau endpoint.

17. The non-transitory medium of claim 15, the operations comprising:
    calculating a fast Fourier transform value for each of the two or more receive antennas; and
    determining relative common phase error values for preambles in the at least one MIMO-OFDM frame using the fast Fourier transform values.

18. The non-transitory medium of claim 17, the operations comprising generating subcarrier channel estimates using the relative common phase error values.

19. The non-transitory medium of claim 18, the operations comprising:
    forming an effective channel matrix;
    using zero forcing equalizer per subcarrier; and
    computing a bit metric weight for a substream.

20. The non-transitory medium of claim 19, the operations comprising:
- generating a scalar common phase error estimate for each data symbol; and
- determining residual frequency offset tracking for each data symbol using the corresponding scalar common phase error estimate.

21. The non-transitory medium of claim 20, the operations comprising:
- forming an equalized signal for a data subcarrier using a corresponding zero forcing equalizer;
- compensating for common phase error in the equalized signal for the data subcarrier; and
- using the compensated signal to obtain a log-likelihood ratio for a soft Viterbi decoder.

\* \* \* \* \*